Figure 1:
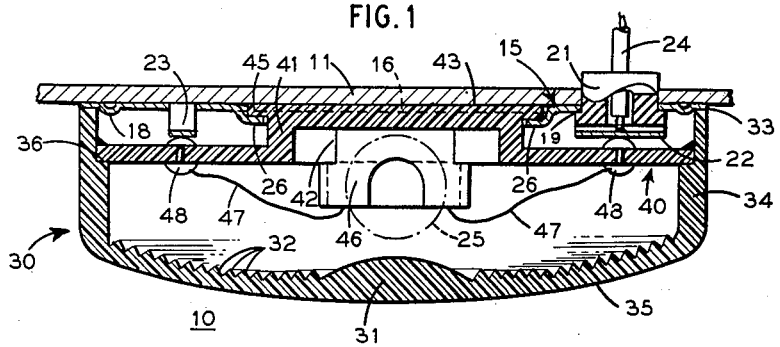
Figure 2:
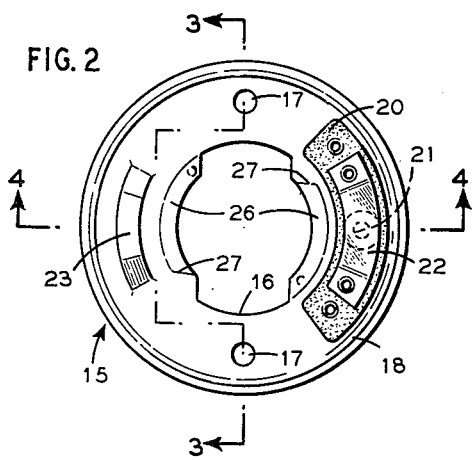
Figures 3, 4:
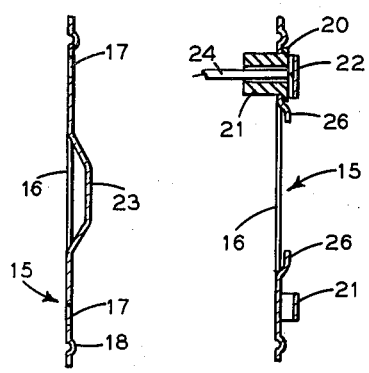
Figure 5:
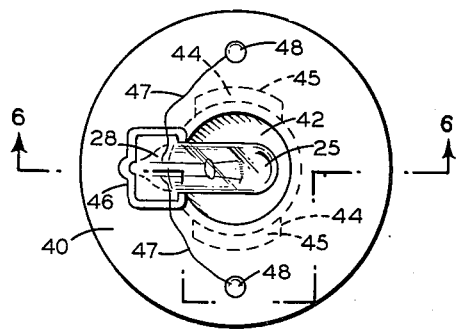

Jan. 26, 1960 H. BUCK 2,922,875
CLEARANCE LAMP FOR AUTOMOTIVE VEHICLES
Filed March 12, 1958

INVENTOR.
Hershell Buck
BY
ATTORNEY

2,922,875

CLEARANCE LAMP FOR AUTOMOTIVE VEHICLES

Hershell Buck, Toronto, Ontario, Canada, assignor to Rae Metal Industries, Limited, Toronto, Ontario, Canada, a corporation of Canada Application March 12, 1958, Serial No. 721,006

7 Claims. (Cl. 240—8.2)

This invention relates to clearance or indicator lamps for automotive vehicles, such as trucks, and more particularly to a novel shallow or thin type clearance lamp easily mounted on a truck body by merely twisting the same in contact with a substantially flat base secured on the truck body, the mounting operation automatically connecting the lamp in its energizing circuit.

Highway regulations and traffic laws set maximum widths, heights, lengths, and per axle weights of commercial vehicles such as trucks. These regulations and laws also require such vehicles to be provided with certain clearance and marker lamps, which are usually mounted on brackets secured to the truck body or underframe.

However, such marker or clearance lamps must be within the overall height, width, and length limits set for the particular truck. Consequently, when they are mounted in projecting relation to the truck body, they cut down the usable volume of the body. In addition, projecting lamps are liable to damage or loss if the truck comes too close to a building wall, bridge abutment or the like.

To the end of increasing the usable volume of the truck body by decreasing the projection of the lamps from the body, it has been proposed to provide substantially flat disk shape lamp housings mounted on a substantially flat mounting base secured to an outer surface of the truck body. These lamp housings have included a circular base of dielectric material and a cup shape cover of transparent or translucent material.

The mounting base is a substantially flat annular metal plate secured to the truck body by screws or rivets and having a relatively large diameter central opening. In securing the mounting base to the truck body, a hole has been formed through the wall of the body aligned with the central opening in the mounting base. Around the periphery of such central opening, the mounting base has been formed with a pair of arcuate offsets or wing guides projecting radially into the opening and generally diametrically opposite each other.

The outer surface of the lamp housing base has a central boss projecting substantially therefrom to engage in the opening in the mounting base and extend through the hole formed in the truck wall. In slightly spaced relation to the outer surface of the lamp base, this boss has been formed with a pair of outwardly projecting arcuate wings arranged to initially fit between the wing guides on the mounting base. By twisting the lamp housing, these wings engage beneath the wing guides to firmly anchor the lamp housing to its mounting base.

The projecting boss is hollow to provide a recess for mounting a lamp comprising a sealed envelope which projects from the interior of the boss into the cup shape cover. Leads extending from the lamp filament are carried through openings in the boss which openings are sealed by dielectric resin cast in the boss to hold the lamp envelope in position. The outer ends of these leads are formed for connection to the circuit wires.

This known arrangement, while very satisfactory from the standpoint of greatly reducing the projection of the lamp from the truck body, has certain disadvantages from the standpoints of mounting the lamp on the truck and replacing the lamp housing when the lamp bulb becomes inoperative. In the first place, a relatively large hole must be formed through the wall of the body to allow the boss on the lamp housing base to project therethrough. This not only further mutilates the truck body but also requires extra time and labor in mounting the lamp.

In the second place, in order to make the lamp operative, the circuit leads must be connected to the lamp leads either before or after the lamp housing is secured to its mounting base. Furthermore, when the lamp bulb becomes defective, these leads must be disconnected to permit removal of the lamp housing and reconnected when a new lamp housing is secured to the base.

In accordance with the present invention, the foregoing disadvantages are avoided by certain novel constructional features. In the first place, the annular mounting base is formed with a pair of contacts which are automatically engaged by a pair of contacts on the lamp housing base when the lamp housing is secured to its mounting base by a turning movement. One of the mounting base contacts, which is the usual ground contact, is formed by deforming a portion of the base out of its general plane. As the mounting base is secured to the metal truck body by metal fasteners, this contact is thus grounded to the truck body. The other mounting base contact is mounted on a dielectric separator on the base and has an insulated lead extending through the separator and base for insertion through a small hole in the truck body covered by the mounting base. This lead is permanently connected to the "live" circuit lead in the truck body. Thus, the connections are made permanently when the mounting base is secured to the truck body.

The mounting base has arcuate wing guides projecting into its central opening and spaced somewhat from its outer surface. These guides are preferably diametrically opposite each other and are arranged to interengage mating arcuate wings projecting from the outer surface of the base of the lamp housing. This base is recessed within the cup shape housing cover to an extent that these wings do not project beyond the base of the cover.

The lamp "socket" is a housing on the inner surface of the lamp housing base opening toward a central recess in the latter forming a shallow boss from which the wings project. The lamp envelope is sealed in its "socket" by plastic cast therein, and projects across the recess.

The filament leads of the lamp envelope are brought out of the "socket" and connected to two conductive metal eyelets or rivets extending through the lamp housing base. These terminals are so located that, when the lamp housing is placed against the mounting base with its wings between the wing guides and then rotated to engage the wings beneath the wing guides, the lamp housing terminals engage the contacts on the mounting base, automatically connecting the lamp in its energizing circuit.

With this construction, it is not necessary to form a large hole through the wall of the truck body. In changing a lamp, all that is necessary is to turn the old housing to disengage it from the mounting base and then mount a new lamp housing in the same manner.

Figure 6:
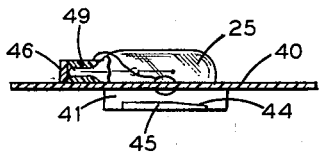

For an understanding of the invention principles, reference is made to the following description of a typical embodiment thereof as illustrated in the accompanying drawing. In the drawing:

Fig. 1 is a diametric sectional view through a clearance lamp embodying the invention, as mounted on a wall of a truck body;

position to the solid line position of Fig. 6, with such increasing imposition of force on the button as to cause switch 20 to close, the pump motor operates impeller 49 and the liquid level falls accordingly, the chamber 63 being subject to the suction at the intake of the impeller. Prior to this, the chamber 63 of the control has been pressurized only upon a rise of the liquid level above the small port 68 in line 64.

As the liquid level falls a partial pressure or vacuum condition becomes effective in chamber 63, which is not materially affected by the small bleeder aperture 68, and this vacuum causes the diaphragm 14 to be held in closing relation to the switch 20. The vacuum is not reduced sufficiently to enable the diaphragm to move away from the switch button and permit the switch to open until the level has dropped beneath the intake, or impeller eye, end of the vacuum line 64. When this occurs, the vacuum in chamber 63 is immediately broken.

The provision of the auxiliary vacuum line 64 is thus seen to constitute a simple and convenient means to materially lengthen the operating cycle of the motor and thus practically dry out the sump before the motor cycle terminates. The optional positioning of the small aperture 68 permits a desired variation in the differential pressurizing of the diaphragm 14 on its opposite sides; and the inverse size proportioning of the larger chamber 63 and smaller vacuum line 64 in relation to the smaller pressure chamber 61 and the larger pressure line 58 affords a further means of timing the installation as to the institution and termination of motor operation.

In reference to Fig. 6, it may be noted that the diaphragm housing or casing 52 is here designed for disposition externally and to one side of a motor housing (not shown), and to this end, a spring clip 70 is affixed to the casing 52 and may snap onto the usual shaft housing 71. However, it will be clear from the foregoing, and it is an important feature of the invention, that the housing or casing 52 need not be mounted to either the pump or its motor, but can be disposed in any convenient location, so long as its pressure tube 58 (and vacuum tube 64 also, if employed) is brought properly into the sump. It follows as another advantage that no part of the housing need be immersed in the sump water.

The control illustrated in Fig. 6 may be, as indicated above, produced as a replacement or adapter unit, for which type of operation the unit has special utility due to certain wiring provisions hereinafter described. The invention as embodied in Fig. 6 also contemplates a modification of the intake tube 58 to the pressurized side of the diaphragm housing or casing 52.

In accordance with this improvement, the tube 58 is, upon installation and proper location relative to the sump, flattened substantially at 58' over a length which will be determined in accordance with the particular installation, the length occurring intermediate the overall length of the tube 58. The outline of the tube, minus the flattened section 58', is shown in dot-dash line in Fig. 6.

Thus, as the sump water level rises, water will rise in the full diameter lower section of the tube 58 and, entering the flattened section 58', its ability to compress air in the chamber 61, for a given increment of water level rise in the sump, is materially diminished. Thus the interval before the diaphragm 14 operates to close switch 20 is increased, and the pump comes into operation at a later time. The duration of this interval may be controlled by lengthening or shortening the flattened section 58', or varying its flatness or its location.

The control regulation may also be accomplished by a rotative adjustment of the tubular externally threaded mounting fitting 26 of switch 20, which fitting threads directly in a boss 53' of switch housing member 53 and is held by a lock nut 53". By this means the switch button 22 may be positioned variably in relation to diaphragm, thus to regulate the commencement and duration of motor cycles, yet the axial alignment of the button and diaphragm remains unchanged.

In the unit illustrated in Fig. 6 the electrical leads 30 from the switch are brought out through the tubular threaded mounting fitting 26, preferably in the form of a conventional insulated cable 73 leading to a conventional electrical plug-in connector 74, and a type of female electrical socket member 75 is connected in the cable 73 with its socket terminals 76 wired in series with the plug 74 and switch terminals 31. Cable 73 may be of any desired length, so that in applying the control unit as a replacement, all that is necessary to do is to connect the existing electrical motor connector (not shown) of the sump pump in the socket 75, then plug the connector 74 in a suitable electrical outlet socket or box. It is not necessary to make any particular mounting for the control housing 52, and any support on which it may be suspended will suffice. Tubes 58 and 64, if used, are brought to the sump as above described.

Fig. 7 illustrates an alternative type of regulatory provision in the intake tube 58 as a means for determining the cut-in and cut-out time of the pump motor in any particular installation. In this instance, the tube 58 is shaped in a spiral coil 59 of flexible tubing intermediate the top and bottom extremities of the tube. The coil is adapted to be elongated by stretching the same to form the intermediate axially distorted coil portion 60, which in the length of a single coil convolution or two will occupy an axial length much greater than the undistorted coil. Accordingly, a given rise of water level in the sump will be more effective, entering the lower coils 59 and effecting a greater displacement of air for a given liquid rise, than in the uncoiled length. It is then possible, by altering the overall length of the coiled section upon installation, by stretching out the portion 60, to set the motor cut-in and cut-out times as desired. The adaptation of Fig. 7 represents a reversal of the effect of the regulatory means shown in Fig. 6.

Fig. 8 illustrates a further modification operating on the principle of Fig. 7 to accomplish the foregoing purpose. In this instance, an adapter casing or chamber 62 is inserted in the intake tube 58, as by connecting fittings 62' at the top and bottom of the casing. The enlarged volume of the latter occasions an increased compression of air in the pressure chamber 61, as water rises from the lower end of tube 58 into the adapter casing 62, with a corresponding adjustment of the motor cut-in and cut-out interval.

What I claim as my invention is:

1. A control unit for a sump pump or like motor, comprising a housing having a flexible diaphragm subdividing its interior into pressure and switch control chambers on opposite sides of the diaphragm, an elongated liquid intake tube downwardly communicating said pressure chamber with a source of liquid to be pumped, a vacuum line to communicate said control chamber with the intake side of the pump, a switch disposed in said control chamber for actuation by said diaphragm upon pressurization of said pressure chamber, said switch having an operating element facing said diaphragm and operated thereby under the effects of pressure and vacuum in said respective pressure and control chambers, said switch being provided with a threaded mount disposed in coaxial alignment with said operating element, said threaded mount having threaded engagement with said housing for rotative adjustment to variably position said operating element relative to said diaphragm.

2. A control unit for a sump pump or like motor, comprising a housing having a flexible diaphragm subdividing its interior into pressure and switch control chambers on opposite sides of the diaphragm, a liquid intake member downwardly communicating said pressure chamber with a source of liquid to be pumped, a vacuum line to communicate said control chamber with the intake side of the pump, a switch disposed in said support has a tubular boss extending through an opening in said disk, and said conductor extends through said tubular boss.

References Cited in the file of this patent

UNITED STATES PATENTS

| | | |
|---|---|---|
| 2,688,688 | Holtz | Sept. 7, 1954 |
| 2,738,413 | Knapp | Mar. 13, 1956 |
| 2,754,410 | Thielorn | July 10, 1956 |